US007062953B2

(12) United States Patent
Yamano et al.

(10) Patent No.: US 7,062,953 B2
(45) Date of Patent: Jun. 20, 2006

(54) SAMPLING TUBE-TYPE SMOKE DETECTOR

(75) Inventors: Naoto Yamano, Yokohama (JP); Yoshitaka Egawa, Machida (JP)

(73) Assignee: Hochiki Corporation, Tokyo (JP)

( * ) Notice: Subject to any disclaimer, the term of this patent is extended or adjusted under 35 U.S.C. 154(b) by 0 days.

(21) Appl. No.: 10/644,821

(22) Filed: Aug. 21, 2003

(65) Prior Publication Data

US 2004/0035184 A1 Feb. 26, 2004

(30) Foreign Application Priority Data

Aug. 22, 2002 (JP) ............................ 2002-241587

(51) Int. Cl.
*G01N 15/02* (2006.01)
*G01N 21/41* (2006.01)
*G01N 21/85* (2006.01)
*G01N 1/14* (2006.01)

(52) U.S. Cl. .................. 73/31.05; 73/28.01; 73/31.07; 73/863.81; 73/864.81

(58) Field of Classification Search ............... 73/28.01, 73/28.03, 28.04–28.06, 31.01–31.03, 31.07, 73/863.21, 863.51, 863.71, 863.81, 864.81, 73/28.02
See application file for complete search history.

(56) References Cited

U.S. PATENT DOCUMENTS

| | | | | |
|---|---|---|---|---|
| 3,794,909 | A * | 2/1974 | Smith | 324/464 |
| 3,965,748 | A * | 6/1976 | Boubel et al. | 73/863.03 |
| 4,586,389 | A * | 5/1986 | Vincent et al. | 73/863.22 |
| 4,615,224 | A * | 10/1986 | Smith et al. | 73/863.33 |
| 4,860,598 | A * | 8/1989 | Bailey et al. | 73/863.33 |
| 4,967,608 | A * | 11/1990 | Yost | 73/866 |
| 5,056,355 | A * | 10/1991 | Hepher et al. | 73/24.03 |
| 5,438,885 | A * | 8/1995 | Zelazny | 73/864.71 |
| 5,514,562 | A * | 5/1996 | Saugmann et al. | 435/23 |
| 5,553,507 | A * | 9/1996 | Basch et al. | 73/863.01 |
| 5,665,924 | A * | 9/1997 | Cole | 73/864.73 |
| 6,401,520 | B1 * | 6/2002 | Volkwein et al. | 73/28.03 |
| 6,425,297 | B1 * | 7/2002 | Sharp | 73/863.33 |
| 6,585,791 | B1 * | 7/2003 | Garito et al. | 55/385.1 |
| 6,615,679 | B1 * | 9/2003 | Knollenberg et al. | 73/863.33 |
| 2003/0077174 | A1 * | 4/2003 | Kim | 416/186 R |
| 2003/0131891 | A1 * | 7/2003 | Sinur et al. | 137/527.8 |

FOREIGN PATENT DOCUMENTS

| | | |
|---|---|---|
| GB | 1 321 016 | 6/1973 |
| GB | 1432531 | 2/1976 |

(Continued)

*Primary Examiner*—Hezron Williams
*Assistant Examiner*—David A. Rogers
(74) *Attorney, Agent, or Firm*—Bacon & Thomas, PLLC

(57) ABSTRACT

In a sampling tube-type smoke detector equipped with a smoke detection device detects smoke particles contained in the air suctioned from a monitored area through a sampling tube by an aspirator positioned in the downstream. The smoke detection device the sampling tube forms a lead-in tube and suctions air through the sampling tube in substantially a straight line. The lead-in tube is formed with a smoke sensor unit to detect smoke particles contained in the air. The aspirator comprises a rotating part which forms an actuator mechanism that discharges the air. The central axis of the lead-in tube and the rotational axis of the actuator mechanism of the aspirator are substantially on the same axis. The sampling tube-type smoke detector is provided to reduce pressure loss in the airflow traveling from the smoke detection device to the aspirator and to supply a low cost, compact smoke detection device driven by a small-sized fan.

8 Claims, 13 Drawing Sheets

FOREIGN PATENT DOCUMENTS

| | | |
|---|---|---|
| JP | 63-157035 | 6/1988 |
| JP | 06-290354 | 10/1994 |
| JP | 10-267803 | 10/1998 |
| JP | 11-025374 | 1/1999 |

* cited by examiner

PRIOR ART

PRIOR ART

PRIOR ART

SAMPLING TUBE-TYPE SMOKE DETECTOR

BACKGROUND OF THE INVENTION

The present invention relates to a sampling tube-type smoke detector which suctions air into a sampling tube from a monitored area and optically detects smoke particles floating in the air using a laser beam, and more particularly to a sampling tube-type smoke detector which includes a smoke detection device and an aspirator aligned in a straight line and formed compactly.

Conventionally, a high sensitivity smoke detector which detects slight smoke is used in a clean room, such as a computer room, in a hospital, a semiconductor manufacturing facility and the like. The highly sensitive smoke detector in this invention suctions air from a sampling tube (synonymous with pipe) installed in a monitored area and optically detects the number of particles floating in the air using a laser beam. Thus, a highly sensitive smoke detector with a sampling tube is hereafter designated a sampling tube-type smoke detector. As shown in FIG. 11, this sampling tube-type smoke detector comprises a sampling tube 101 with suction openings 102 which suctions in air from a monitored area, a smoke detection device 103 which detects smoke particles contained in the suctioned air connected to the sampling tube 101, and an aspirator 108 which is formed in the downstream of the smoke detection device 103.

The sampling tube 101 is formed in a monitored area and comprises a detection line 101*a* with multiple suction openings 102 every 1–2 meters (1–2 m=about 1–2 yards apart) prescribed spacing and a connection line 101*b* which guides air to the smoke detection device 103 from the detection line 101*a*. Additionally, the smoke detection device 103 connected to the sampling tube 101 is equipped with a laser diode 104*a* which is a light emitting device and a photodiode 104*b* which is a photo detector. A chamber 107 is formed in the downstream of the smoke detection device 103 and the aspirator 108 is installed in the interior of the chamber 107. The smoke detection device 103, the chamber 107 and the aspirator 108 are dedicated to a detector main body 100 which consists of a cube-type configuration, wall surfaces and the like in formation of the chamber.

The laser diode 104*a* generates diffused light extended along the direction of the optical axis which is condensed with an image-formation lens located on the optical axis, and performs image-formation in the flow path of the smoke detection device 103. Smoke particles are carried to the image-formation position. The light from the laser diode 104*a* produces scattered light as a result of these smoke particles. This scattered light is received by the photodiode 104*b* located in a position which makes an optical axis of the light from the laser diode 104*a* at a predetermined degree angle and generates a pulse signal. A signal processing part 106 detects smoke particles generated by a fire by performing signal processing. Also, air passing through the smoke detection device 103 is discharged in the chamber 107. Subsequently, this air is discharged outside by the aspirator 108 installed in the chamber 107.

Such a sampling tube-type smoke detector, for instance, the system in the first conventional example shown in FIG. 12 is used. In this first conventional example, a smoke detection device 103 and an aspirator 108 constitute a sampling tube-type smoke detector, which are placed in a detector main body 100 resembling a cube-type shape. The smoke detection device 103 comprises a lead-in tube 103*a* connected with a sampling tube 101. A smoke sensor unit

104 is located in the intermediate part of the lead-in tube 103*a*, detects smoke particles and is arranged in a corner of the detector main body 100. Additionally, the smoke sensor unit 104 in the downstream of the lead-in tube 103*a* is equipped with an airflow sensor 105 for performing clogging detection in the lead-in tube 103*a*. The aspirator 108 has a motor-actuated, centrifugal-type fan and discharges air at a predetermined flow rate to the outside of the detector main body 100. The aspirator 108 is arranged in a corner of the smoke detection device 103 on the opposite side of the detector main body 100.

In the case of this first conventional example, segments other than the smoke detection device 103 in the detector main body 100 and the aspirator 108 are hollow and form a chamber 107. Once air suctioned through a sampling tube 101 passes the smoke detection device 103 and is discharged into the chamber 107, subsequently the aspirator 108 discharges the air to the outside of the detector main body 100. With the form of the chamber 107, the air suction state in the sampling tube 101 can be stabilized by making the pressure inside the chamber 107 low as air is suctioned. Thus, in the first conventional example, since the chamber 107 is formed of the entire detector main body 100, the signal processing part involving the smoke sensor unit 104, the power circuit of the aspirator 108, processing of the detection signal from the smoke sensor unit 104, and the like are separately located external of the detector main body 100.

As a sampling tube-type smoke detector, the system in the second conventional example shown in FIG. 13 is used. In this second conventional example, a smoke detection device 103 and an aspirator 108 which constitute the sampling tube-type smoke detector are the same as that of the above first conventional example concerning the point of view of being placed in a detector main body 100 which resembles a cube-type shape. In addition, those which have a smoke sensor unit 104 the same as that of the first conventional example are also used for detection of smoke particles. However, unlike the first conventional example, in the second conventional example, the flow path from a sampling tube 101 to the inlet port of the smoke detection device 103 connected with the aspirator 108 is formed in a single sequence. Specifically, the smoke detection device 103 is a lead-in tube 103*a*. The lead-in tube 103*a* is located in the intermediate section connected with the sampling tube 101 and comprises the smoke sensor unit 104 which detects smoke particles. The lead-in tube 103*a* of the smoke detection device 103 forms a direct connection to the aspirator 108. An airflow sensor 105 is formed in the downstream of the smoke sensor unit 104 similar to the first conventional example.

The aspirator 108 is driven by a motor comparable to the first conventional example, has a centrifugal-type fan, and discharges air at a predetermined discharge flow rate to the outside of the smoke detection device 103. The fan's rotational axis makes an angle of 90 degrees with the upper part of the lead-in tube 103*a*. Consequently, the lead-in tube 103*a* from the smoke sensor unit 104 bends at an angle of 90 degrees in the downstream part. Thus, without forming a chamber, the inflow of the smoke detection device 103 to the aspirator 108 forms the air duct, and the smoke detection device 103 can be formed compactly. Since in the segment which was the chamber of the detector main body 100 in the first conventional example can be made to create space in the second conventional example, a signal processing part 106 which performs management of smoke particle detection signals and the like from the smoke sensor unit 104 can also be installed in the interior of the detector main body 100.

However, these conventional sampling tube-type smoke detectors have specific limitations which are described below. The above-mentioned first conventional example suctions air by using the entire detector main body as a chamber and stabilizes the suction state of the sampling tube.

However, to acquire effective stabilization a large-sized chamber is essential. On the other hand, within the constraints of the magnitude of the sampling tube-type smoke detector, target objective stabilization is problematic. Within the chamber, there are existing cases in the interior where a portion of the flow stagnated, which does not necessarily contribute to suction stabilization. Furthermore, in the first conventional example, miniaturization is difficult as most of the main body is used as a chamber. As the signal processing from the smoke sensor unit, the power circuit and the like are located external of the detector main body, a lot of space is required for the entire device.

Besides, the above-described second conventional example, without a formed chamber the flow path guides the air from the smoke detection device directly to the aspirator and miniaturization is achieved. However, due to a limitation in the bulkiness of the detector main body, the rotational axis of the fan of the aspirator is oriented so that it becomes the lead-in tube of the smoke detection device with an angle of 90 degrees approximately. Therefore, a flow path of 90 degrees must bend. In the section where the flow path bends, pressure loss occurs in the airflow, and a comparatively large-sized fan needs to be used as the aspirator.

This invention introduces a novel approach to solve the above-mentioned limitations, which reduces the airflow pressure loss in the flow path from the smoke detection device to the aspirator, and aims at providing a sampling tube-type smoke detector which has a compact smoke detection device and can be driven by a small-sized fan.

SUMMARY OF THE INVENTION

The present invention has been made in view of the circumstances described above. Accordingly, the purpose of the present invention is to solve the above-mentioned subject. According to the present invention, the sampling tube-type smoke detector comprises a smoke detection device which detects smoke particles contained in the air suctioned through a sampling tube from a monitored area; an aspirator positioned in the downstream of the smoke detection device; the smoke detection device forms a substantially straight line to a lead-in tube which draws suctioned air through the sampling tube; a smoke sensor unit detects smoke particles contained in the air of the lead-in tube; the aspirator forms the actuator mechanism of a rotating part that discharges the air; and the lead-in tube and the aspirator are oriented with the central axis of the lead-in tube and the rotational axis of the actuator mechanism of the aspirator being substantially the same axis.

According to the present invention, the lead-in tube and the aspirator are arranged so the lead-in tube is formed in a substantially straight line along the central axis of the lead-in tube and the rotational axis of the actuator mechanism of the aspirator are substantially on the same axis. The air duct from the smoke detection device leading to the aspirator can be formed in a substantially straight line and pressure loss in the airflow can be suppressed to a minimum. As the smoke detection device and the aspirator can be formed compactly, the smoke detection device can be miniaturized and driven by a small-sized fan.

According to the present invention, in the sampling tube-type smoke detector the lead-in tube is sequentially connected to the aspirator through an expanded part. The expanded part is formed so that the flow path expands along the traveling direction of the air.

Furthermore, considering the flow path width can be extensively contained as the smoke detection device is formed in sequence with the expanded part to the aspirator, whereby the flow path extends along the traveling direction of the air, airflow pressure loss can be effectively suppressed.

According to the present invention, in the sampling tube-type smoke detector the lead-in tube essentially resembles a substantially round-shaped cross-sectional form. The lead-in tube and the expanded part are connected with the connection part. The connection part inner wall surface connects to the lead-in tube inner wall surface and the expanded part inner wall surface in a reciprocally continuous smooth curved surface.

Further, in this invention, the lead-in tube is effective in suppressing the pressure loss of the airflow by vortex flow generated in the rotating part of the aspirator by being essentially formed in a substantially round shape.

In addition, according to this invention, the lead-in tube is made with a sequentially mutual wall side of the adjacent parts consisting of a segment formed in a substantially square-shape and a segment formed in a substantially round-shape, respectively. In order for the airflow of the lead-in tube to meet in a straight line with the connection part, they are formed together as one piece. As the flow path of the lead-in tube is designed to not produce a level difference, by forming the lead-in tube with the connection part as a mutually sequential smooth curved surface, airflow pressure loss can be suppressed.

According to the present invention, in the sampling tube-type smoke detector, the expanded part inner wall surface which is sequentially formed to the lead-in tube through the connection part resembles a substantially semi-sphere shape. The expanded part is formed in series with the aspirator.

Furthermore, as the expanded part is formed in a substantially semi-sphere shape in the inner wall surface and installed sequentially by the aspirator, it effectively optimizes the abatement of pressure loss in the connection part.

According to the present invention, in the sampling tube-type smoke detector, the connection part is equipped with a thin metal-like aperture. The aperture has an aperture diaphragm opening smaller than the inside diameter of the lead-in tube central part and in the center of the aperture diaphragm opening is arranged substantially on the centerline of the lead-in tube.

According to the present invention, in the sampling tube-type smoke detector, the aperture diaphragm opening of the aperture has a diameter of approximately 30 to 70 percent compared to the inside diameter of the lead-in tube.

Further, in this invention, as the aperture diaphragm opening is a diameter smaller than the inside diameter of the lead-in tube central part and the aperture is fixed so that the center of the aperture diaphragm opening is arranged to be substantially centerline with the flow path of the lead-in tube, the airflow streaming down the lead-in tube 10 can be controlled as well as decreased air pressure. Also, as the aperture diaphragm opening consists of a diameter approximately 30 to 70 percent in size as compared to the inside diameter of the lead-in tube, the aperture is effectively optimized.

According to the present invention, in the sampling tube-type smoke detector, the aspirator comprises a body part and a discharge part. The body part contains the rotating part and the actuator mechanism. The discharge part discharges air to the outside discharged from the rotating part, and the discharge part is arranged in an approximately vertical direction to the rotational axis of the rotating part. The discharge part discharges the air made to flow in a straight line from the lead-in tube and the expanded part to the side of the aspirator. An air duct for discharging air from the rotating part is arranged in the periphery of the body part. An air discharge vent is formed in the discharge part, and the discharge part is equipped with a guide which forms the air duct and the discharge vent into a reciprocally continuous smooth curved surface.

Further, according to this invention, since a level difference is not produced in the discharge part of the aspirator by having a guide which makes the air duct and the discharge vent into a reciprocally continuous smooth curved surface, air pressure loss can be effectively suppressed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

Figure 1:
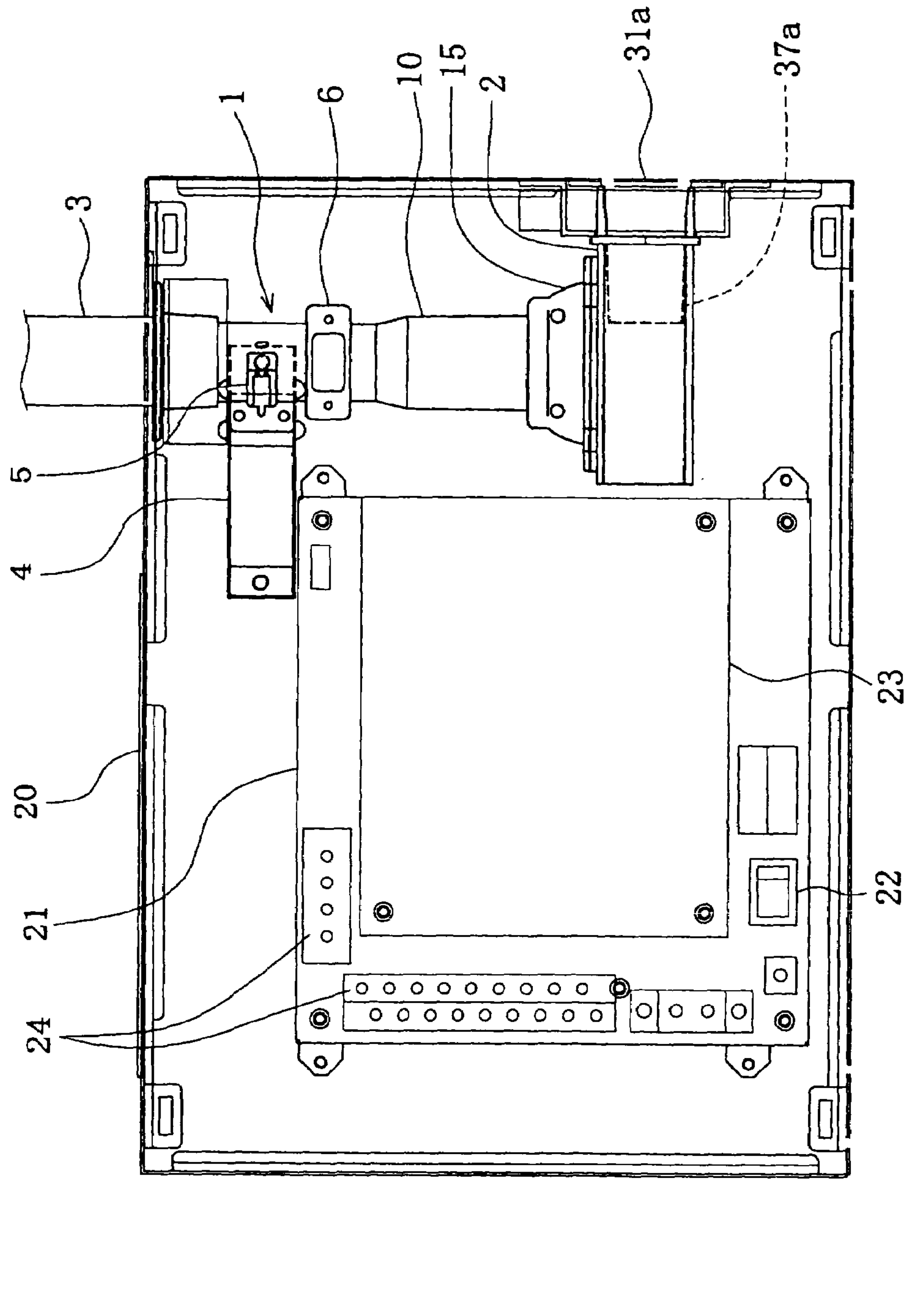
FIG. 1 is a front elevation view showing the internal configuration of the detector main body in the embodiment of this invention.
Figure 2:
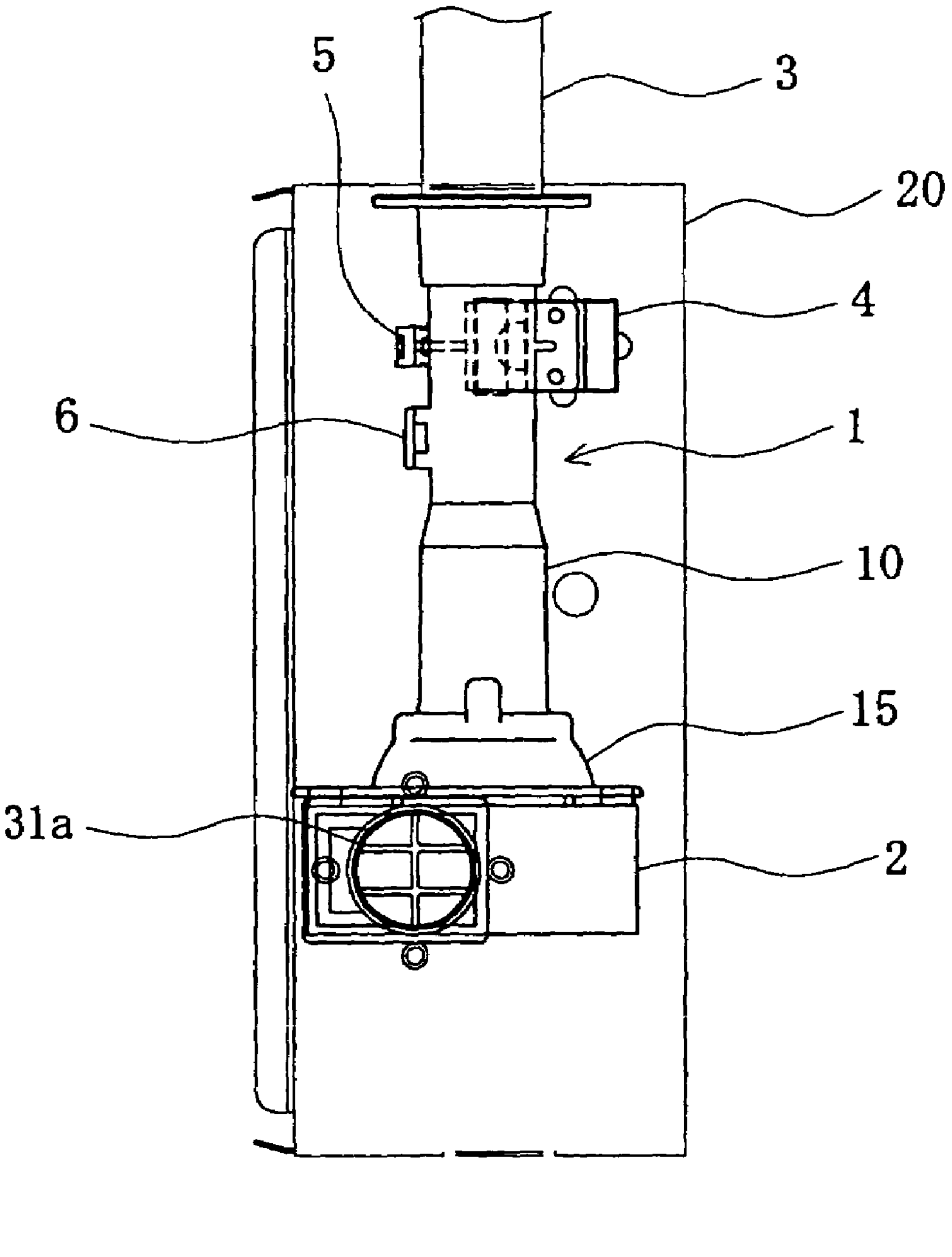
FIG. 2 is a right-hand side surface view showing shown the internal configuration of the detector main body in the embodiment of this invention.
Figure 3:
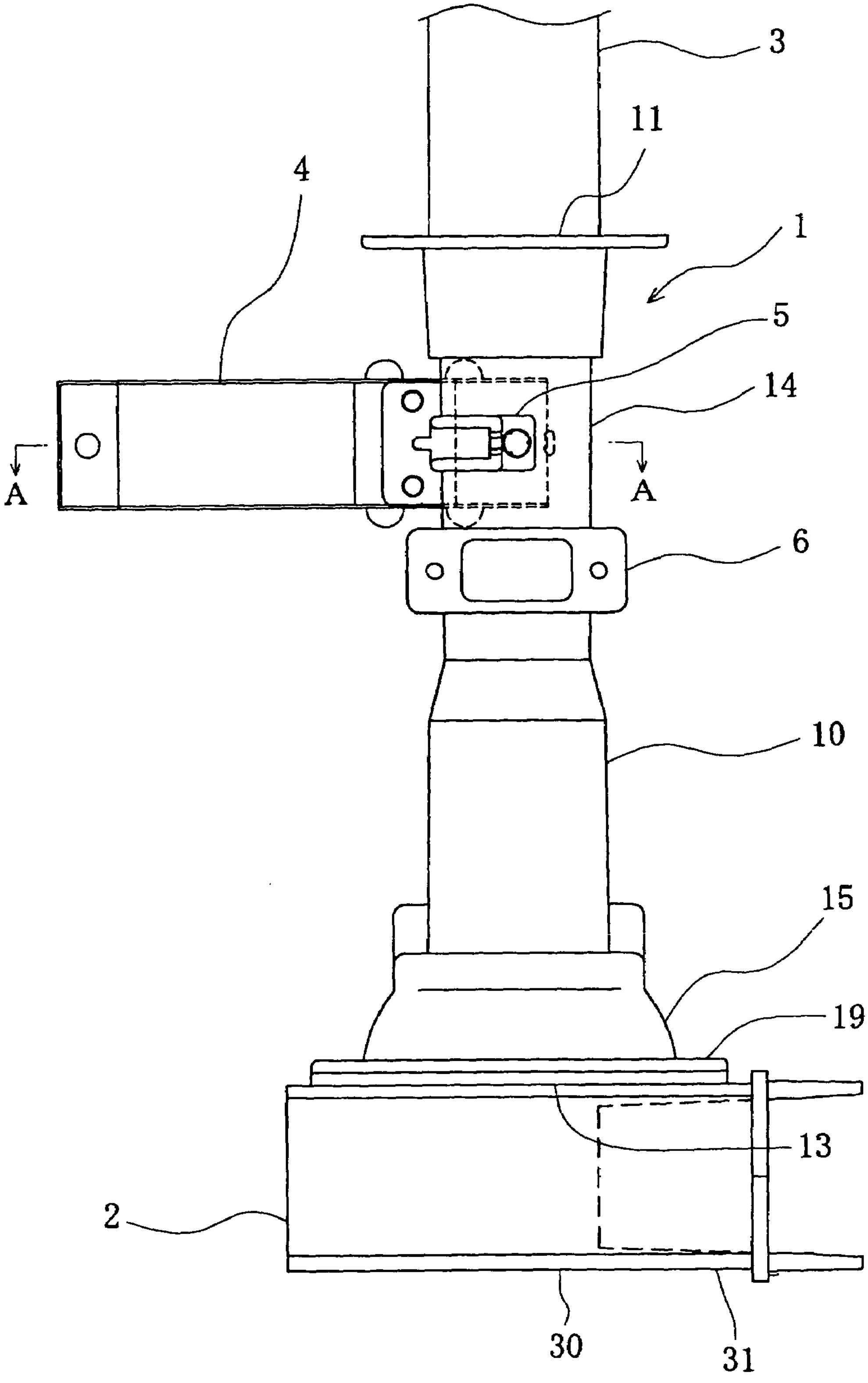
FIG. 3 is a front elevation view of the smoke detection device in the embodiment of this invention, the connection part and an aspirator.
Figure 4:
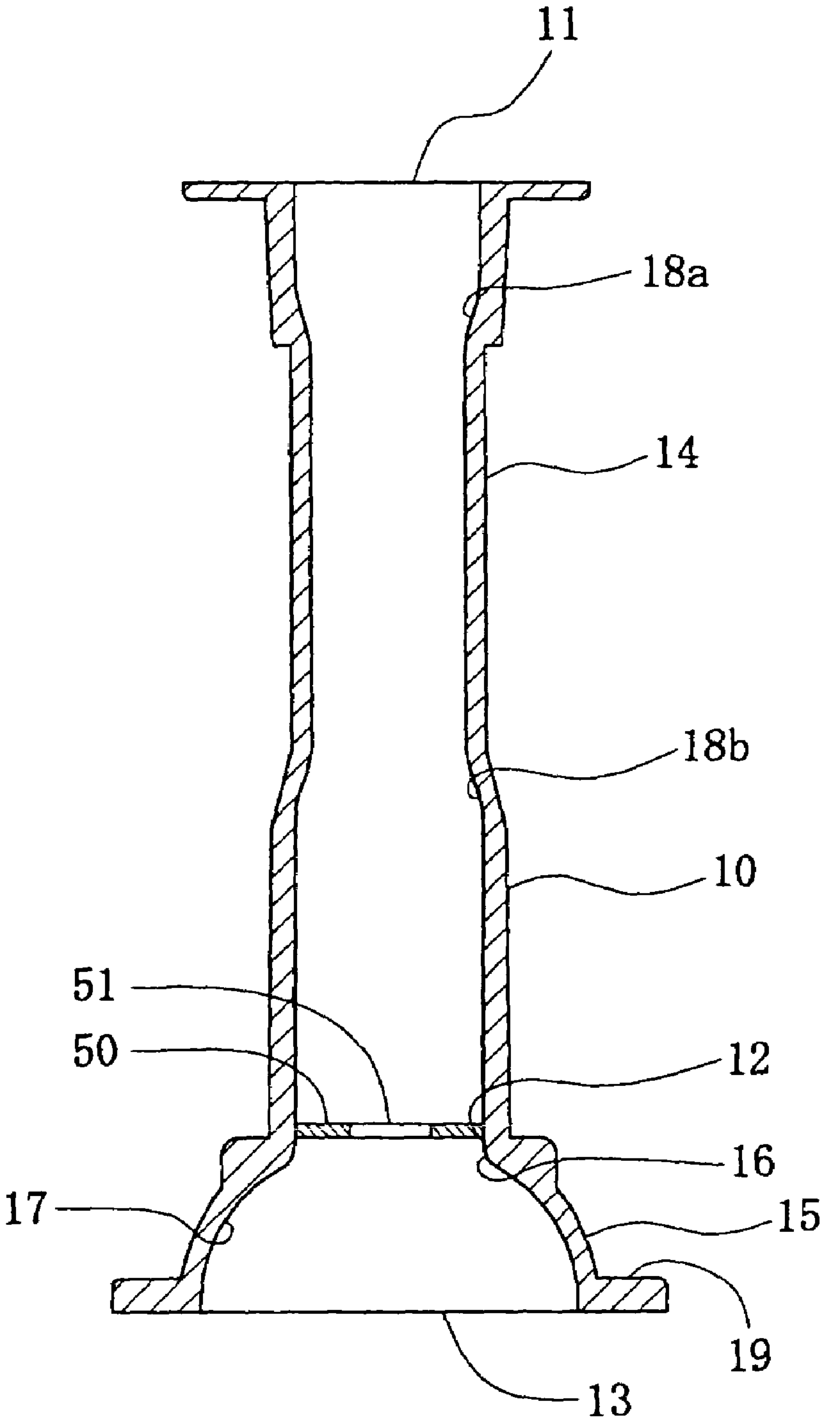
FIG. 4 is cross-sectional view of the lead-in tube in the embodiment of this invention and a connection part.

The present invention will hereinafter be described in detail with reference to the preferred embodiment shown in the accompanying drawings. FIG. 1 is a front elevation view showing the internal configuration of the detector main body in this embodiment. FIG. 2 is a right-hand side surface view of FIG. 1. FIG. 3 is a front elevation view of the smoke detection device in this embodiment. FIG. 4 is cross-sectional view of the lead-in tube which constitutes the smoke detection device and the inter-connection part.

The sampling tube-type smoke detector in this embodiment comprises a sampling tube 3 with suction openings 42 (see FIG. 7) formed in a monitored area. A smoke detection device 1 detects smoke particles contained in the air suctioned through the sampling tube 3. An aspirator 2 is formed in the downstream of the smoke detection device 1. The smoke detection device 1 and the aspirator 2 connect by way of an inter-connection part 15. Among those which constitute the sampling tube-type smoke detector, the smoke detection device 1, the aspirator 2, and the inter-connection part 15 are placed in a detector main body 20, which consists of a cube-type configuration as shown in FIG. 1. In addition, the smoke detection device 1 is connected with the sampling tube 3. The air drawn from the sampling tube 3 through the smoke detection device 1 is discharged outside from the aspirator 2. This air duct, from an inflow 11 of the smoke detection device 1 until ending at the inflow point of the aspirator 2 without bending, forms a substantially straight line shape and decreased pressure by way of pressure loss is suppressed.

The smoke detection device 1 and the aspirator 2 are arranged in a corner of the detector main body 20. The remaining section consists of a hollow interior formed with a control apparatus 21 and a power supply 22. Furthermore, in the interior of the detector main body formed by the smoke detection part 1, the inter-connection part 15 and the aspirator 2, air from the monitored area does not flow into a section other than an air duct 36 (FIG. 8) of the aspirator.

Figure 7:
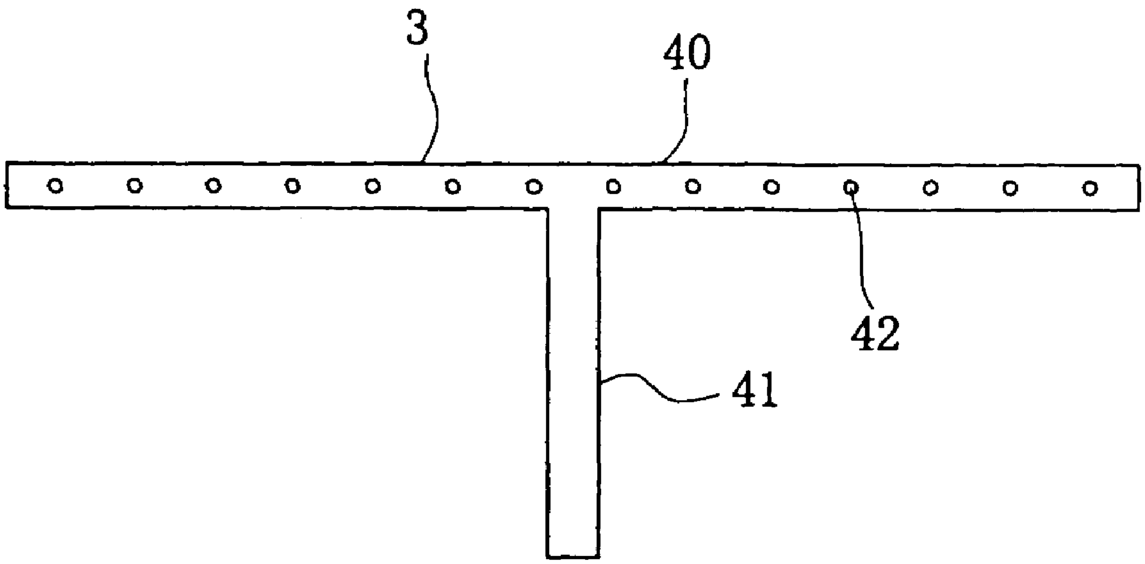
FIG. 7 is a schematic diagram of the sampling tube in the embodiment of this invention.

As shown in FIG. 7, the sampling tube 3 is composed of a T-shaped line formed in the monitored area and has a detection line 40 with two or more suction openings 42. The detection line 40 is formed at a perpendicular with a connection line 41 connected to the smoke detection device 1. As for the detection line 40 and the connection line 41, both resemble a substantially round-shaped cross-sectional form. The detection line 40 suction openings 42 are located every 1–2 meters (1–2 m=about 1–2 yards apart) prescribed spacing and formed in a standard round shape of 1–2 millimeters (1–2 mm=about 0.04–0.08 inches) in diameter. The connection line 41 is formed in a substantially straight line shape and connected to a lead-in tube 10 of the smoke detection device 1 in a substantially straight line. Thus, the centerline of the connection line 41 is approximately in a direct line with the centerline of the lead-in tube 10 and oriented to substantially coincide.

As shown in FIGS. 3 and 4, the smoke detection device 1 is equipped with a smoke sensor unit 4 which detects smoke particles in the lead-in tube 10 formed in a substantially straight line from the air inflow 11 connected to the sampling tube 3 to an air outflow 12. Additionally, the smoke detection device 1 consists of a Light-Emitting Diode 5 (hereafter referred to as LED 5) for performing sensitivity tests of the smoke sensor unit 4 and an airflow sensor 6 which measures the flow velocity. Thus, the lead-in tube 10 of the smoke detection device 1 is formed in a substantially straight line, without bending the air duct from the inflow 11 until reaching the outflow 12. Therefore, since the centerline constitutes a substantially direct line, the connection line 41 of the sampling tube 3 and the inflow 11 of the lead-in tube 10 until reaching the outflow 12 is formed sequentially on a substantially straight line.

Figure 6:
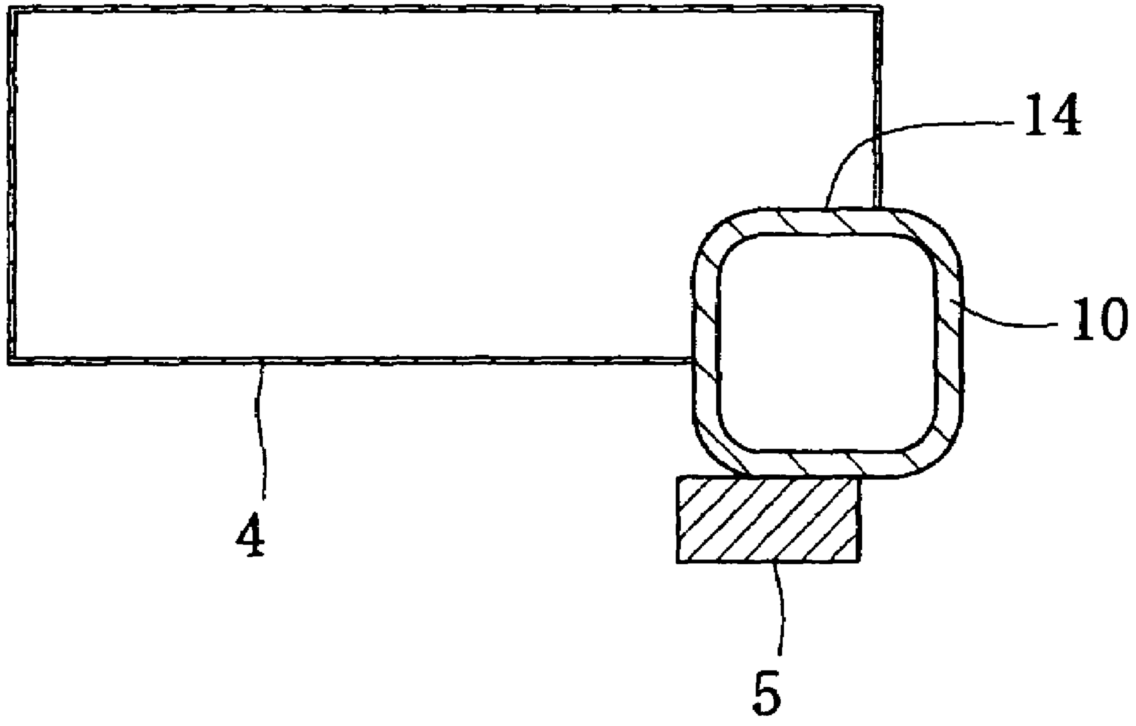
FIG. 6 is cross-sectional view of the lead-in tube in the embodiment of this invention.

The lead-in tube 10 essentially resembles a substantially round-shaped cross-sectional form entirely. However, the segment around the inflow 11 of the lead-in tube 10 resembles a substantially square-shaped cross-sectional form where the four corners are beveled. In this substantially square-shaped section, the smoke sensor unit 4 and the airflow sensor 6 are attached sequentially from the upper part and form a stationary portion 14. FIG. 6 shows the lead-in tube 10 the part formed in a substantially square-shaped cross-sectional segment in which the smoke sensor unit 4 is attached. The lead-in tube 10 is then formed in a substantially round-shaped cross-sectional segment in the downstream portion from the mounting locations of the adjacent inflow 11 and the airflow sensor 6. The downstream part of the lead-in tube 10 (i.e., the cross-sectional segment near the aspirator 2), is also formed in a substantially round shape. This has an effect on the airflow produced in the rotary motion of a rotating part 32 of the aspirator 2, which is suppressed at a low level and pressure loss is reduced as much as possible.

In this way, because the sectional form changes along the way, the lead-in tube 10 causes a level difference in adjacent parts 18*a* and 18*b* of the substantially square-shaped cross-sectional segment and the substantially round-shaped cross-sectional segment, respectively. Except these adjacent parts 18*a* and 18*b* form a smooth curved surface of the substantially square-shaped cross-sectional segment and the substantially round-shaped cross-sectional segment to respectively continue sequentially. Consequently, the fact that the adjacent parts 18*a* and 18*b* are formed so that the different cross-sectional form segments continue in series, they do not cause airflow turbulence and air pressure loss in the lead-in tube 10 is suppressed at a low level.

The smoke sensor unit 4 for detecting smoke particles which flow inside the lead-in tube 10 of the smoke detection device 1 segment resembles a substantially rectangle-shaped cross-sectional form. The smoke sensor unit 4 is formed in the upper part of the segment resembling a substantially square-shaped cross-sectional form, (i.e., the stationary portion 14 near the inflow 11 of the lead-in tube 10). Since the smoke sensor unit 4 is formed in a location distant from the aspirator 2, this lessens the effects of vortex flow (spiral motion) and the like on the smoke sensor unit 4 from the aspirator 2 formed in the downstream of the lead-in tube 10.

Figure 10:
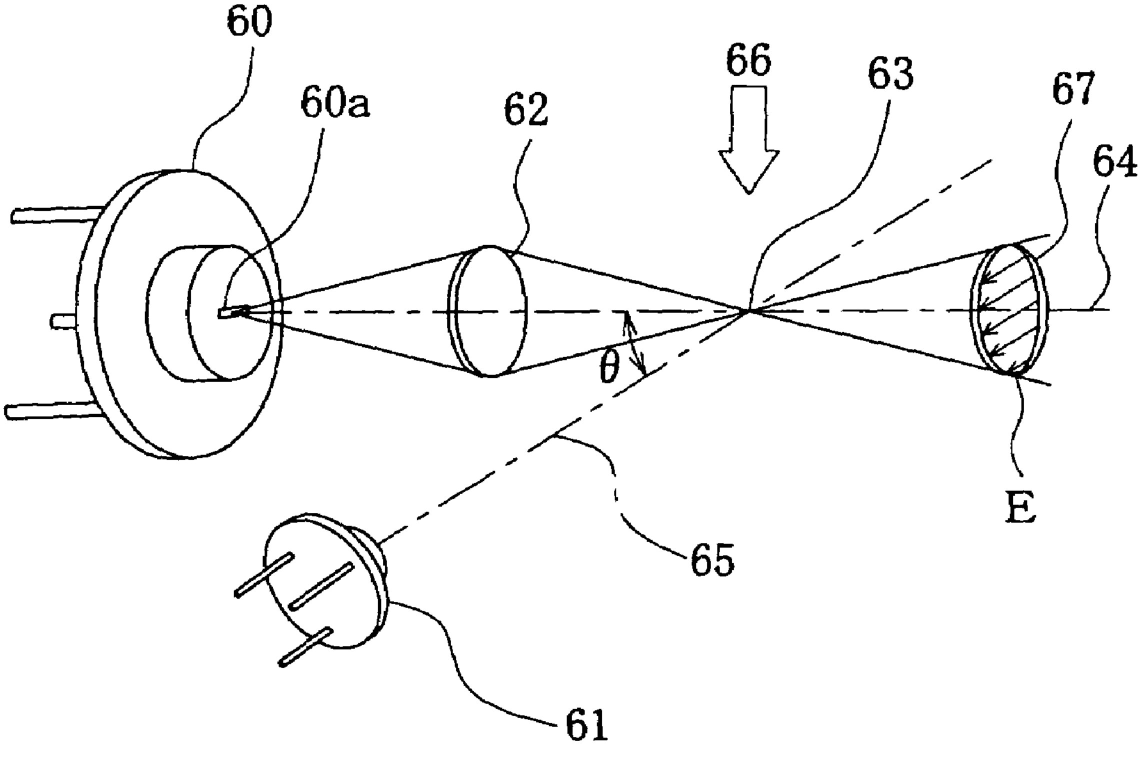
FIG. 10 is a mimetic diagram showing the principle of detection of smoke particles in the smoke sensor unit.
Figure 11:
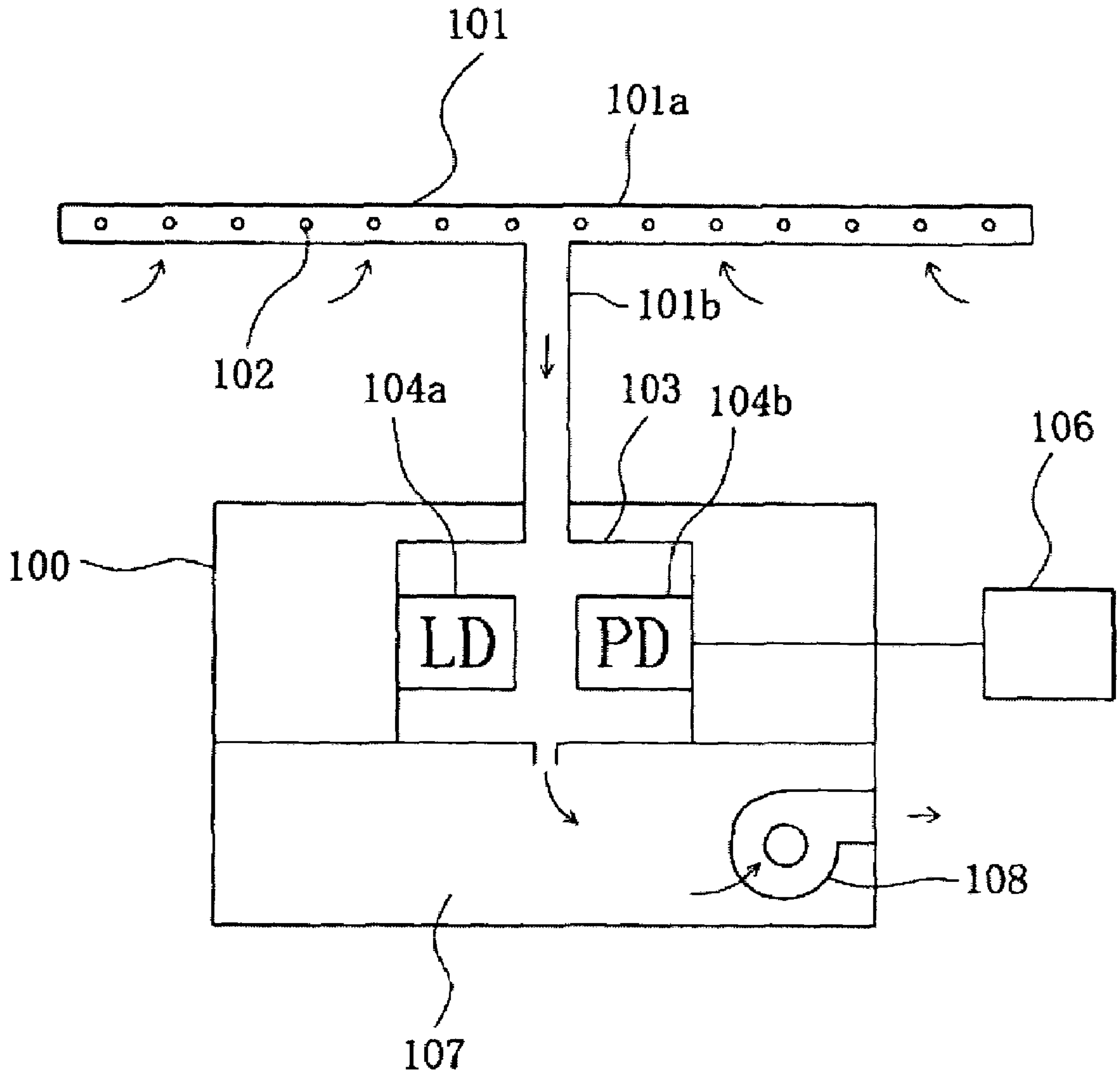
FIG. 11 is a mimetic diagram showing the outline of a prior art sampling tube-type smoke detector.
Figure 12:
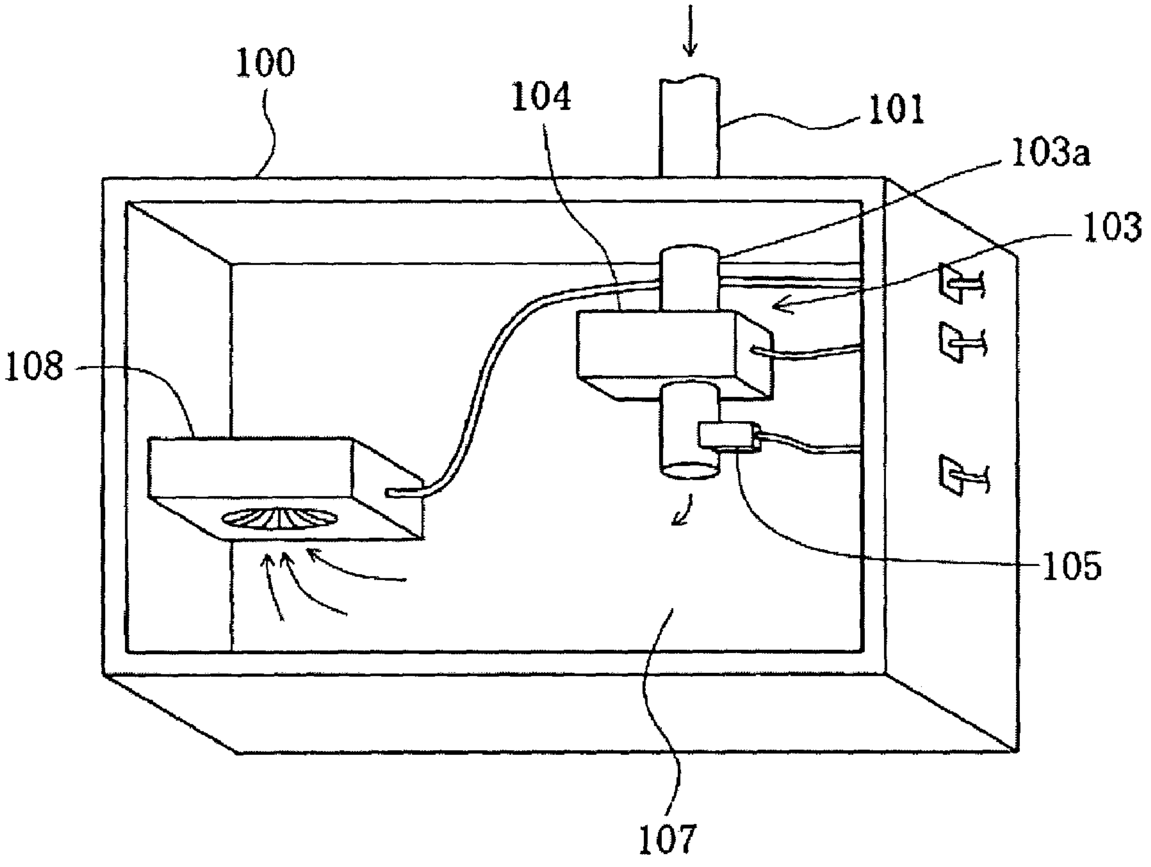
FIG. 12 is a mimetic diagram showing the first conventional prior art example.
Figure 13:
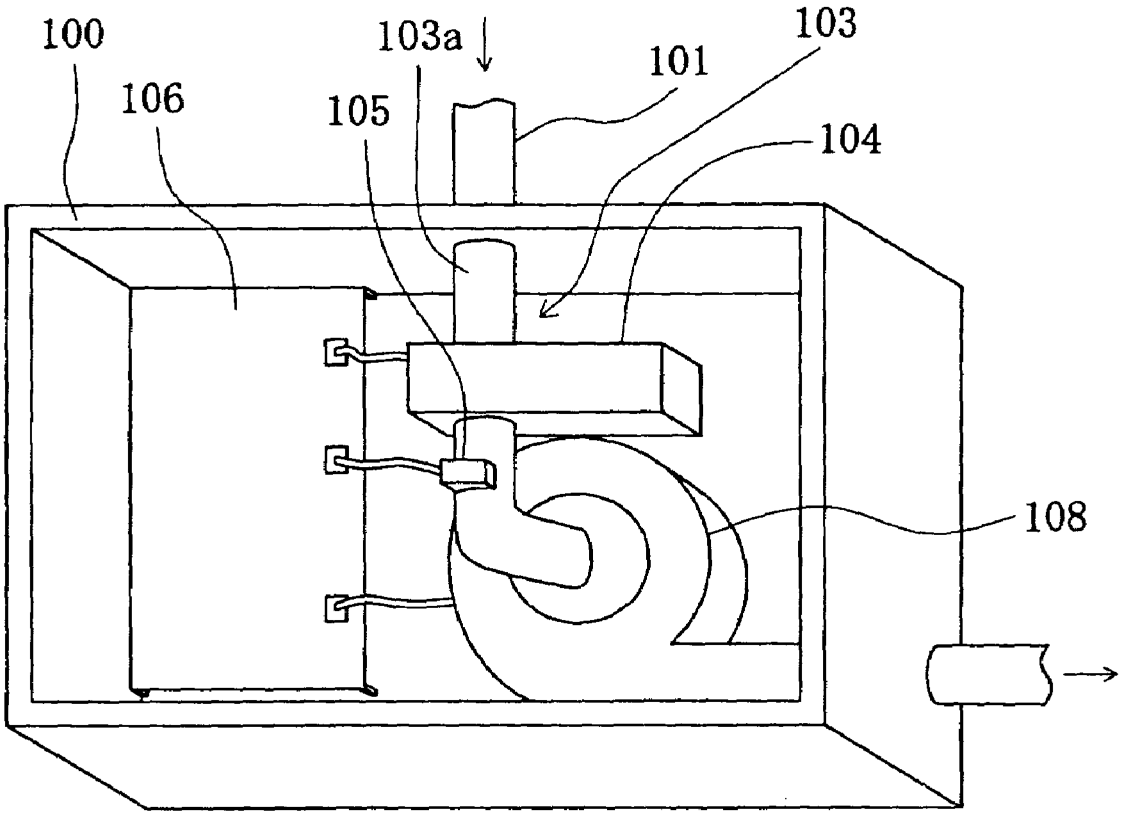
FIG. 13 is a mimetic diagram showing the second conventional prior art example.

As shown in FIG. 10 as a mimetic diagram of the detection principle of the smoke particles, the smoke sensor unit 4 is equipped with a laser diode 60 which emits a laser beam and a photodiode 61 which receives the laser beam. The laser diode 60 is equipped with a laser diode tip 60*a*, whereby an electric field creates a diffusion (spreading) wave of the laser beam into a single polarization oscillation which is constant in a predetermined direction and performs output radiation. The laser beam from the laser diode 60, which performs the output radiation, is condensed with an image-formation lens 62. The image-formation lens 62 is oriented so that image-formation of the laser beam may be performed on the centerline of the lead-in tube 10 of the smoke detection device 1 where the air current passes. Furthermore, the photodiode 61 is arranged on a light detecting optical axis 65 parallel to the direction of an electric field E. An ellipse pattern 67 shows the optical intensity distribution direction of a laser beam optical axis 64 cross-sectional, which passes and diffuses an image-formation position 63 by arrow 66.

The air current which flows inside of the lead-in tube 10 of the smoke detection device 1 passes through the image-formation position 63 of the laser beam from the laser diode 60 as mentioned above. The image-formation of the light source image from the laser diode 60 is projected onto the laser beam image-formation position 63. This image constitutes a microscopic spot of about 1 μm (one thousandth (10–3) of a millimeter). For this reason, a smoke particle contained in the air current passes the spot segment of the image-formation position 63 one by one. If smoke particles pass the spot segment of the image-formation position 63, scattered light occurs. This scattered light will be most efficiently received by the photodiode 61 oriented parallel and toward the direction of the laser beam electric field E, and the light detecting pulse signal will be acquired.

Signal processing of the light detecting pulse signal of the smoke sensor unit 4 is sent and processed by a signal processing part 23, which judges the existence of smoke particles. In the signal processing part 23, for example, by counting the number of times the light detecting pulse signal unit of time exceeds the predetermined threshold, the microscopic smoke density is calculated based on this number of counts. Also, smoke density can be calculated based on the total value of the pulse width of the light detecting pulse signal obtained in relation with the unit of time. On occasions when the predetermined smoke density is calculated in the signal processing part 23, an alarm signal is generated, the predetermined LED of an LED area 24 located in the control apparatus 21 lights up, and the signal processing part 23 reports an outbreak of a fire.

Additionally, the LED 5 for testing is formed in a position which adjoins the smoke sensor unit 4 in the lead-in tube 10. LED 5 for testing is oriented on the optical axis of the photodiode 61 which is the photo detector of the smoke sensor unit 4. Also, LED 5 performs incidence of the examined pulsed light corresponding to the scattered light at the time smoke particles pass through the image-formation position 63 to the photodiode 61. If needed for reference the number of passing smoke particles per unit of time in contrast to smoke density beforehand, light emission from LED 5 for testing can be accomplished easily in a sensitivity test corresponding to an arbitrary smoke density.

In the segment resembling a substantially square-shaped cross-sectional form of the lead-in tube 10, the airflow sensor 6 is formed in the downstream part of the smoke sensor unit 4. As the airflow sensor 6 as well as the smoke sensor unit 4 is attached to the stationary portion 14 located in the upper part of the lead-in tube 10, it is hardly vortex flow and the like influenced from the rotating part 32 of the aspirator 2. A thermal type element with a thermistor component is used for the airflow sensor 6 and formed without protruding into the flow path of the lead-in tube 10. In this manner, without disrupting the airflow, pressure loss is prevented.

A filter which is not illustrated is located in the sampling tube 3. Dust and the like from a monitored area suctioned from the sampling tube 3 are prevented from entering into the smoke detection device 1. In the event this filter is blocked from dust and the like in, the discharge of air deteriorates and the system becomes incapable of detecting smoke particles in the smoke detection device 1. For this reason, the airflow sensor 6 measures the flow velocity in the smoke detection device 1. On occasions when the speed decreases below a constant value with the flow velocity, the airflow sensor 6 generates an alarm signal. An alarm signal is sent to the control apparatus 21, and generates an alarm report for a clogged filter by making the predetermined LED of the LED area 24 switch on (light up).

Figure 8:
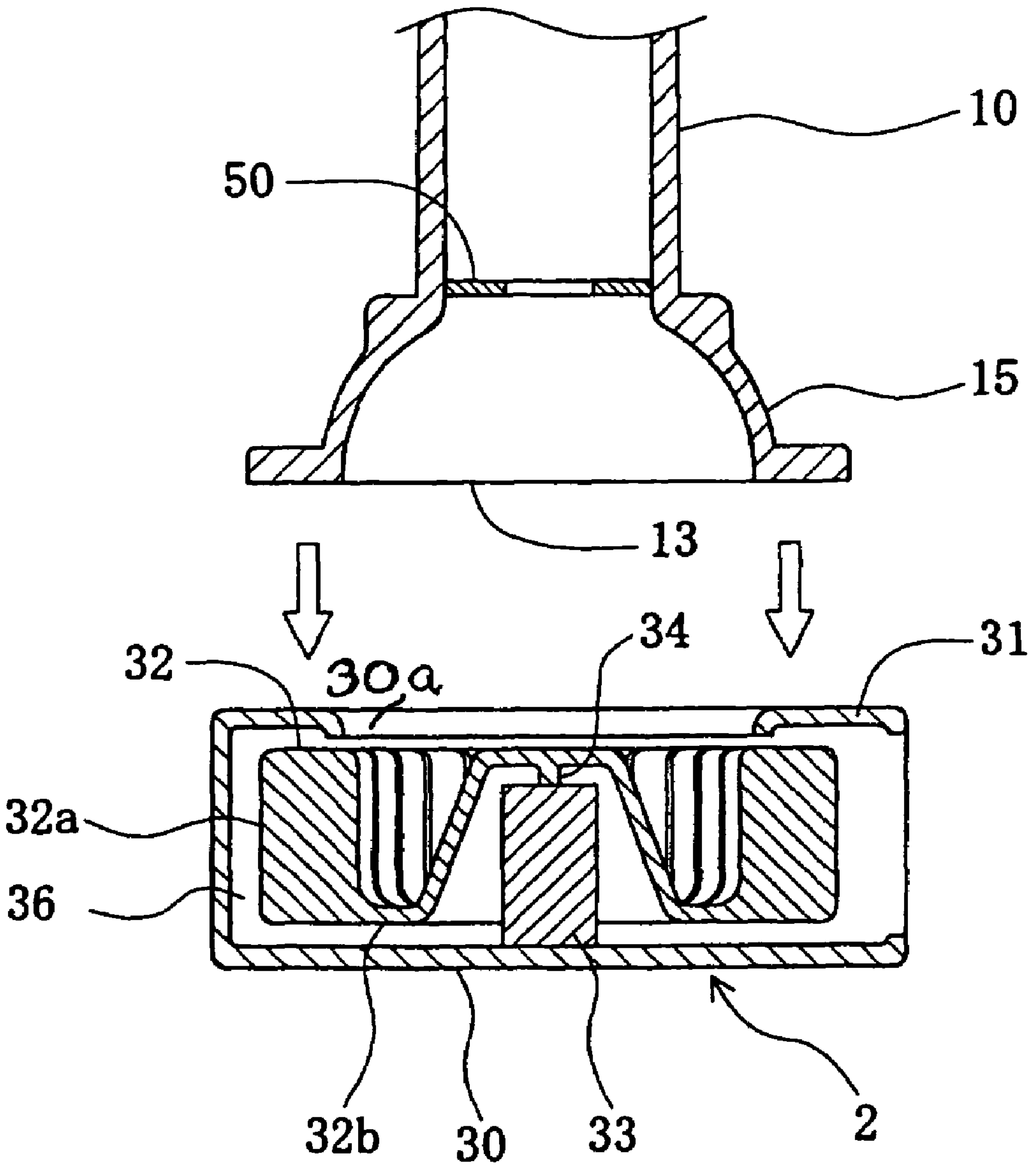
FIG. 8 is a cross-sectional drawing showing the assembly and sequential formation of the lead-in tube and the aspirator in the embodiment of this invention.
Figure 9:
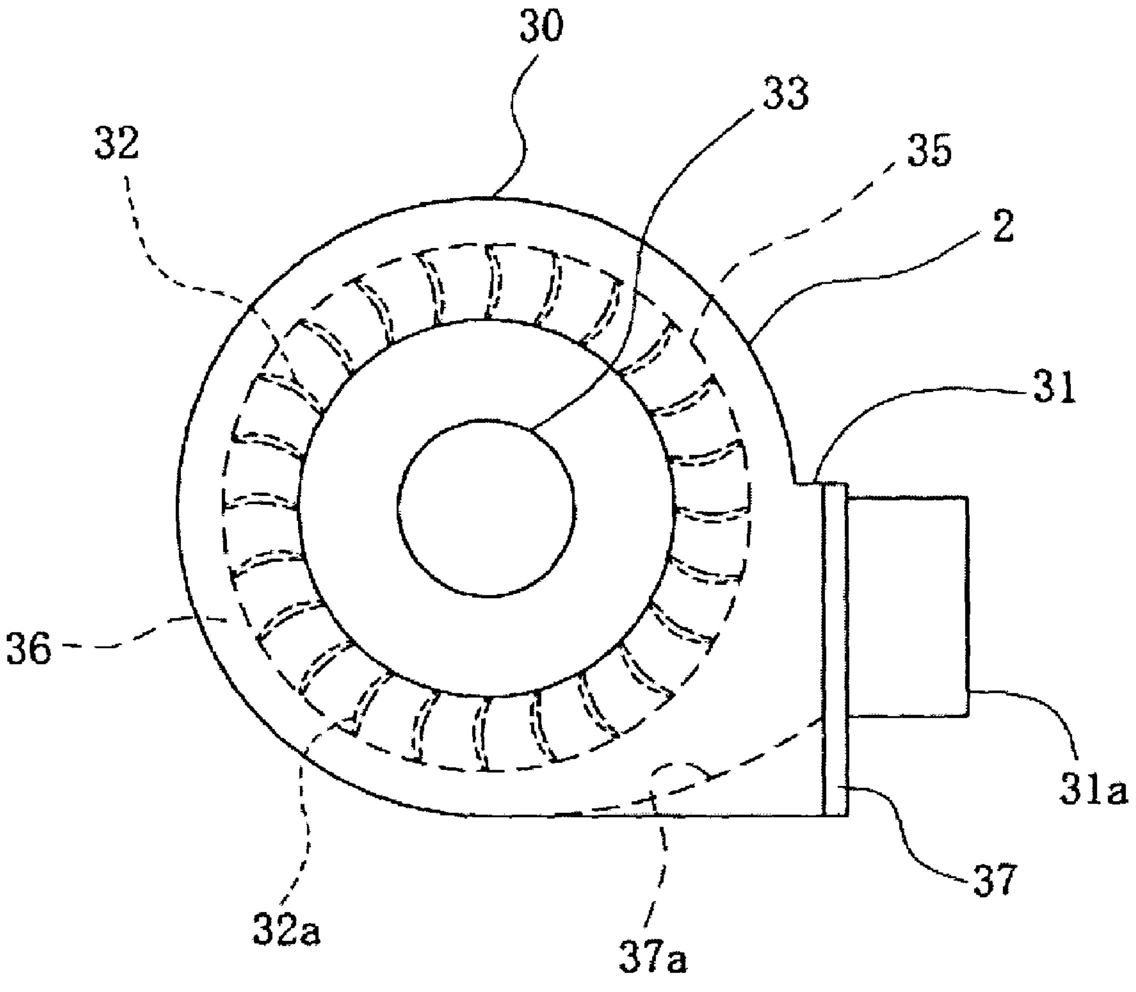
FIG. 9 is a side view which shows the aspirator from the lead-in tube side in the embodiment of this invention.

As shown in FIGS. 8 and 9, the aspirator 2 constitutes a discharge part 31 in the body part 30 equipped with the rotating part 32 and an actuator mechanism 33. The body part 30 forms the rotating part 32 and the actuator mechanism 33 in the center. The air duct 36 is located spaced between a periphery line 35 of the rotating part 32 and the body part 30. Also, the contour of the body part 30 is formed in a substantially cylinder shape so that the air duct 36 located in the periphery to the rotating part 32 constitutes a substantially constant width.

As shown in FIG. 8, the rotating part 32 holds the centrifugal fan blades 32*a*. The centrifugal fan blades 32*a* feed air to the periphery from the central part in a rotary motion. The centrifugal fan blades 32*a* are formed by a turntable 32*b*, which connects the actuator mechanism 33 with the centrifugal fan blades 32*a*. The periphery line 35 of the centrifugal fan blades 32*a* constitute a substantially round shape, where between the periphery line 35 of the centrifugal fan blades 32*a* and the body part 30 forms the air duct 36. The actuator mechanism 33 comprises a motor and is connected with the turntable 32*b* of the rotating part 32. For this reason, the rotating part 32 and the actuator mechanism 33 are constituted considering a rotational axis 34 as the same axle.

A sectional drawing of the aspirator 2 as seen from the direction of the lead-in tube 10 is shown in FIG. 9. When the actuator mechanism 33 rotates counter clockwise, the centrifugal fan blades 32*a* also rotate in the counter clockwise direction, draw the air of the lead-in tube 10 through aspirator inlet 30*a*, and discharge this air in the direction of the outer side of the centrifugal fan blades 32*a* to the air duct 36. Air discharged by the air duct 36 flows along the periphery inner wall surface of the body part 30, and subsequently discharged from the discharge part 31 to the outside of the body part 30.

Additionally, it is advisable to install a cap 37 in the discharge part 31 according to the circumstances of the physical relationship of the discharge part 31 located in the detector main body 20. More specifically, when a discharge vent 31*a* is placed closer to the center rather than the periphery of the aspirator 2, in this position it causes a level difference in the periphery of the air duct 36 and the discharge vent 31*a* in the body part 30. Therefore, in order to smooth the flow path applied to the discharge vent 31*a* from the periphery of the air duct 36 in the body part 30, attach the cap 37 in the aspirator 2. The cap 37 constitutes the segment used as the discharge vent 31*a*, and the segment for attaching in the aspirator 2. The discharge vent 31*a* resembles a substantially round-shaped cross-sectional form, and it is arranged at the center closer to the periphery part of the aspirator 2 when the cap 37 is attached in the aspirator 2. A guide 37*a* is formed in the cap 37. The guide 37*a* is applied to the discharge vent 31*a* from the air duct 36 located in the periphery of the body part 30, and constitutes to connect the flow path into a smooth curve transition surface. In this way, by forming the air duct 36 in the discharge part 31 of the aspirator 2 into a smooth curve, the air pressure loss produced by a level difference can be reduced, and the discharge vent 31*a* can be arranged in the desired position of the detector main body 20.

In addition, as shown in FIG. 8, the rotating part 32 of the aspirator 2 is constituted as having the actuator mechanism 33, which projects to the central part in the lead-in tube 10 side. If the lead-in tube 10 were to be connected directly with the aspirator 2, between the actuator mechanism 33 and the lead-in tube 10, it will become very narrow. Thus, when constructed, the air duct will narrow in the connection segments of the lead-in tube 10 and the aspirator 2, and will produce airflow pressure loss in the segment. For this reason, between the lead-in tube 10 and the aspirator 2, an inter-connection part 15 which is explained below is provided.

As shown in FIG. 4, the inter-connection part 15 has an expanded part 17 where the flow path expands along the direction of air movement, and connects the lead-in tube 10 of the smoke detection device 1 to the expanded part 17 by a connection part 16. The expanded part 17 resembles a substantially semi-sphere shape in the inner wall surface. The connection part 16 makes the lead-in tube 10 and the expanded part 17, which are formed in a substantially straight line, progress along a smooth curve. The expanded part 17 formed in a substantially semi-sphere shape in the inner wall surface is arranged substantially on the centerline of the lead-in tube 10. The air flows down a straight line flow path in lead-in tube 10, and also without bending in the inter-connection part 15, which is made to flow down to the aspirator 2.

The inter-connection part 15 can be connected to the smoke detection device 1 and the aspirator 2 without narrowing the flow path from the lead-in tube 10 to the aspirator 2. This is achieved by having the expanded part 17, which forms the inner wall surface in a substantially semi-sphere shape. Concerning the contour of the expanded part 17, besides the substantially semi-sphere shape, connecting a cylindrical element which has a larger inside diameter compared with the lead-in tube 10 or an element formed in a substantially cone shape and a substantially trumpet shape have been considered. However, in this invention, the element formed in an a substantially semi-sphere shape is the most preferred.

In addition, the lead-in tube 10 and the inter-connection part 15 are formed in one cylindrical body. Therefore, the lead-in tube 10, the connection part 16, and the expanded part 17 are formed as a series of flow paths. Further, this series of flow paths from the lead-in tube 10 to the inter-connection part 15 are shapes which eliminate surface irregularities as much as possible.

Thus, the flow path from the lead-in tube 10 until the inter-connection part 15 is formed as a continuous smooth contour without surface irregularities. Pressure loss by vortex flow or the like caused irregularities and pressure loss by friction produced from irregularities in the surface flow path can be reduced. Thus, as the lead-in tube 10 and the inter-connection part 15 are formed in one piece, air can be efficiently suctioned with the aspirator 2 without creating crevices (gaps) in the flow path. The lead-in tube 10 and the inter-connection part 15 are comprised of ABS resin (thermo plastic) and the like resin material, and cast in one piece using a molding die.

Figure 5:
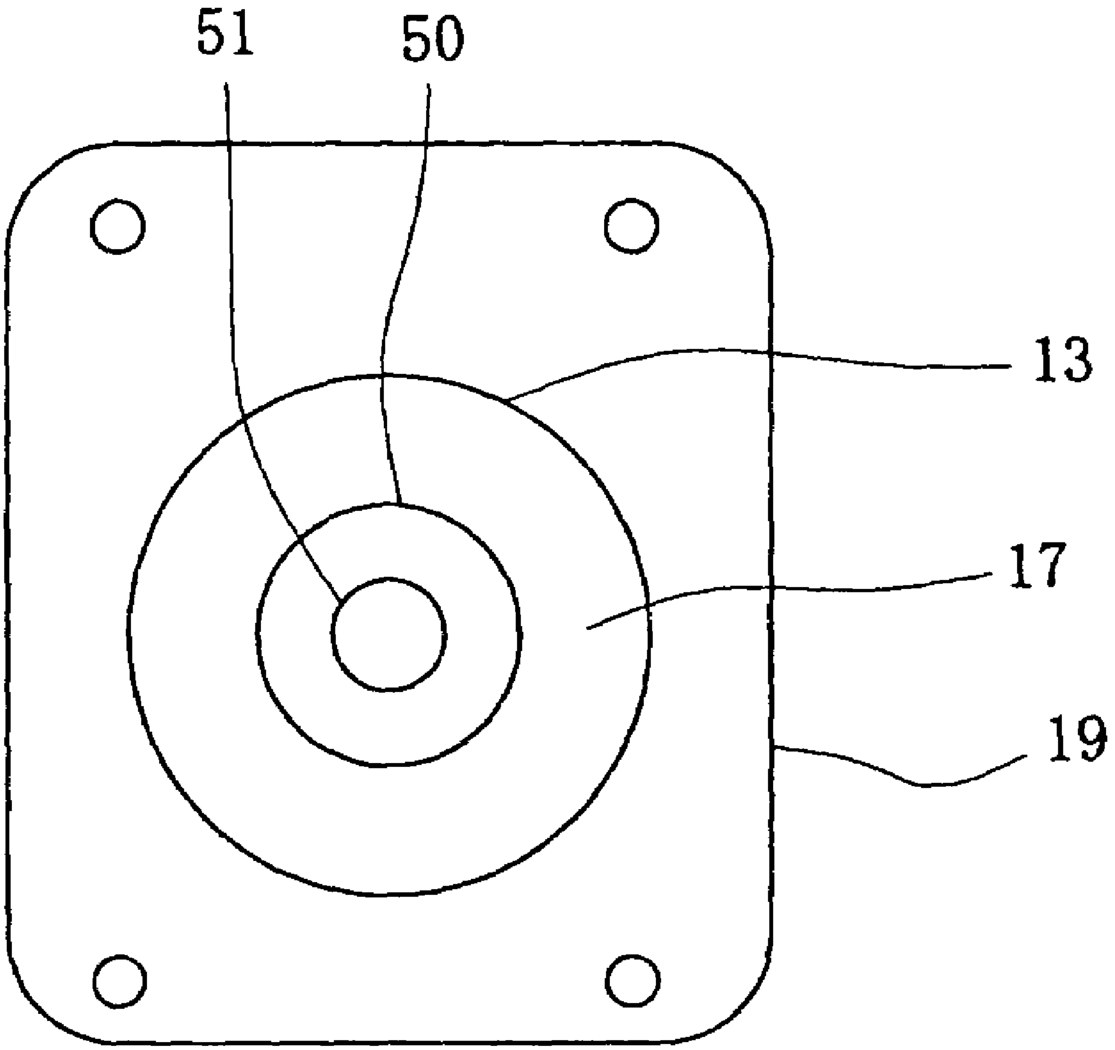
FIG. 5 is a bottom view of the lead-in tube in the embodiment of this invention and a connection part.

As shown in FIGS. 4 and 5, an aperture 50 with an aperture diaphragm opening 51 is formed in the central part of the connection part 16. The aperture 50 is made of round thin metal. The aperture diaphragm opening 51 is a diameter smaller than the inside diameter of the lead-in tube 10 central part. The aperture diaphragm opening 51 consists of a diameter approximately 30 to 70 percent in size as compared to the inside diameter of the lead-in tube 10. Additionally, the aperture 50 is fixed so that the center of the aperture diaphragm opening 51 is arranged to be substantially centerline with the flow path of the lead-in tube 10 and the inter-connection part 15.

Airflow travels down the lead-in tube 10 and comprises low flow velocity near the wall surface boundary layer and high flow velocity near the centerline mainstream section. By forming the aperture 50 in the inlet port of the inter-connection part 15, of the airflow which streams down the lead-in tube 10, only the flow of the mainstream section can be guided to the inter-connection part 15 or the aspirator 2, and the decreased air pressure can be controlled. Additionally, the effect of the airflow turbulence accompanying the rotation of the rotating part 32 of the aspirator 2 has on the smoke sensor unit 4 or the airflow sensor 6 can be reduced by the aperture diaphragm opening 51 of the aperture 50.

A connection flange 19 is formed in a connection opening 13 which is the vent for the inter-connection part 15. The connection flange 19 and the aspirator 2 are connected with screws. In this case, as shown in FIG. 8, the aspirator 2 is installed in the smoke detection device 1 so the flow path of the lead-in tube 10 may be countered. Thus, the rotating part 32 of the aspirator 2 and the rotational axis 34 of the actuator mechanism 33 are arranged in a straight line and formed to be substantially centerline of the lead-in tube 10. Thereby, from the lead-in tube 10 to the inflow of the inter-connection part 15 and the aspirator 2, the flow path is formed in a substantially direct line.

Thus, by forming an air duct in the detector main body 20 in a substantially direct line, air pressure loss in the smoke detection device 1 or the inter-connection part 15 can be suppressed to the minimum. Although the aspirator 2 constitutes a centrifugal fan that is smaller-sized than before, a predetermined airflow rate can be achieved. Therefore, the smoke detection device 1, the aspirator 2, and the inter-connection part 15 in the detector main body 20 can be formed compactly. As a larger space can be secured in the detector main body 20 compared to conventional sampling tube-type smoke detectors, the control apparatus 21, the power supply 22 and the like can be made built-in the detector main body 20 and miniaturization of the entire device can be attained.

The power supply 22 supplies the control apparatus 21 and power source which processes the signal from the smoke sensor unit 4 and generates an alarm are formed in space other than-the smoke detection device 1 of a detector main body 20, the aspirator 2 and the inter-connection part 15. The control apparatus 21 contains the signal processing part 23. The signal processing part 23 receives the light detecting pulse signal from the light detecting part of the smoke sensor unit 4 and detects the existence of smoke particles. If the smoke density exceeds a constant value, LED of the LED area 24 located in the control apparatus 21 will light up and an outbreak of a fire will be reported. Equipped with multiple LEDs, separate LED can be made to emit light according to the smoke density.

In addition, the signal processing part 23 receives signals from the airflow sensor 6 formed in the smoke detection device 1. LEDs different from those which report an outbreak of a fire in the LED area 24 located in the control apparatus 21 emit light (light up) on occasions when the flow velocity in the flow path of the lead-in tube 10 becomes less than a constant value and for a clogged line. Also, the power supply 22 comprises an AC power supply input, a power switch and a conversion circuit that changes alternating current into direct current. The power supply 22 is formed on the same substrate as the control apparatus 21 and supplies the power source to the smoke sensor unit 4, the airflow sensor 6 and the control apparatus 21.

Although only one embodiment of this invention was explained until now, this invention should not be limited to the embodiment described above, but may be realized in forms which are variously different within the limits of the technological concept. For example, in this embodiment, in regard to the lead-in tube 10 and the inter-connection part 15 being formed in one piece, by remaking these as separate elements, respectively, they also may well be oriented on the centerline of the expanded part 17 and substantially centerline of the lead-in tube 10. In this embodiment, the aperture 50 was formed in the inlet port of the inter-connection part 15. However, even if the aperture 50 is not necessarily provided, should the lead-in tube 10, the inter-connection part 15 and the aspirator 2 be arranged in a straight line, reduction of the air pressure loss can be promoted.

In this embodiment, although the control apparatus 21 and the power supply 22 are dedicated to the interior of the detector main body 20, these can also be located external of the detector main body 20 as separate element. Furthermore, the detection method of the smoke density by the control apparatus 21 can use all the methods recognized conventionally which detect scattered light by smoke particles. Moreover, in this embodiment, as opposed to making an LED of the LED area 24 located in the control apparatus 21 light up when the control apparatus 21 detects smoke particles, the control apparatus 21 can also transmit an alarm signal via an external disaster prevention receiving panel and the like over communication lines.

While the present invention has been described with reference to the preferred embodiments, it is our intention that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A sampling tube-type smoke detector comprising:

an optical smoke detection device arranged to detect smoke particles contained in air suctioned through a sampling tube from a monitored area;

an aspirator positioned downstream of said smoke detection device arranged to suction air through said sampling tube;

a lead-in tube arranged to convey air from said sampling tube to said aspirator;

said aspirator having an inlet and comprising a rotating part that sucks air through and discharges air from the lead-in tube and an actuator mechanism driving said rotating part in rotation about a rotational axis;

said lead-in tube being connected directly to the air inlet of said aspirator through an expanded part of the lead-in tube and in which expanded part the flow path expands along the traveling direction of the air;

said lead-in tube and said aspirator being oriented with the central axis of said lead-in tube and the rotational axis of said rotating part being substantially coaxial;

said lead-in tube, optical smoke sensor unit and aspirator disposed in substantially a linear alignment;

said lead-in tube has a substantially round-shaped cross-sectional form defining a lead-in tube inner wall surface;

said lead-in tube and said expanded part are connected via a connection part of the lead-in tube defining a connection part inner wall surface;

said connection part inner wall surface intersecting said lead-in tube inner wall surface and said expanded part inner wall surface along a smoothly contoured curve;

said connection part is equipped with a restricted aperture defined by an aperture diaphragm opening smaller than the inside diameter of said lead-in tube central part;

wherein the center of said aperture diaphragm opening is arranged substantially on the centerline of said lead-in tube; and said aperture diaphragm opening is disposed between said smoke sensor unit and said aspirator.

2. A sampling tube-type smoke detector comprising:

an optical smoke detection device arranged to detect smoke particles contained in air suctioned through a sampling tube from a monitored area;

an aspirator positioned downstream of said smoke detection device arranged to suction air through said sampling tube;

a lead-in tube arranged to convey air from said sampling tube to said aspirator through a restricted aperture;

said aspirator having an inlet and comprising a rotating part that sucks air through and discharges air from the lead-in tube and an actuator mechanism driving said rotating part in rotation about a rotational axis;

said lead-in tube being connected to the air inlet of said aspirator by an expanded part connected directly to the aspirator and in which expanded part the flow path expands along the traveling direction of the air;

said lead-in tube and said aspirator being oriented with the central axis of said lead-in tube and the rotational axis of said rotating part being substantially coaxial;

said lead-in tube, optical smoke sensor unit and aspirator disposed in substantially a linear alignment;

said restricted aperture is arranged between said optical smoke detection device and said aspirator.

3. The sampling tube-type smoke detector according to claim 2, wherein said lead-in tube has a substantially round-shaped cross-sectional form defining a lead-in tube inner wall surface;

said lead-in tube and said expanded part are connected via a connection part of the lead-in tube defining a connection part inner wall surface; and said connection part inner wall surface intersecting said lead-in tube inner wall surface and said expanded part inner wall surface along a smoothly contoured curve.

4. The sampling tube-type smoke detector according to claim 3, wherein said connection part inner wall surface joins an inner wall surface of said expanded part of said lead-in tube and is configured as a smoothly curved contour having a substantially semi-spherical shape; and said connection part is attached to said lead-in tube adjacent to said aspirator.

5. The sampling tube-type smoke detector according to claim 3, said aspirator including a body part and a discharge part;

said body part containing said rotating part and said actuator mechanism;

said discharge part arranged to discharge air from said rotating part to the outside of the smoke detector, said discharge part arranged in a 90 degree direction relative to said rotational axis of said rotating part;

said discharge part discharging air made to flow in a straight line from said lead-in tube and said expanded part to the inlet of said aspirator;

an air duct for discharging air from said rotating part arranged in a periphery of said body part;

a discharge vent formed in said discharge part; and said discharge part equipped with a guide which forms a smoothly curved transition surface between said air duct and said discharge.

6. The sampling tube-type smoke detector according to claim 3, wherein said connection part is equipped with said restricted aperture defined by an aperture diaphragm opening smaller than the inside diameter of said lead-in tube central part;

wherein the center of said aperture diaphragm opening is arranged substantially on the centerline of said lead-in tube.

7. The sampling tube-type smoke detector according to claim 6, wherein said aperture diaphragm opening of said aperture has a diameter of 30 to 70 percent of the inside diameter of said lead-in tube.

8. The sampling tube-type smoke detector according to claim 6, including an inter-connection part between said connection part and said aspirator, said inter-connection part including said expanded part, said expanded part including a smoothly expanding inner surface, said inter-connection part terminating at an inter-connection part outlet, said inter-connection part outlet being larger in cross section area than the cross section area defined by the inner wall surface of the connection part; said lead-in tube, connection part, expanded part and inter-connection part being formed as one continuous integral piece.

* * * * *